Feb. 19, 1952 J. M. KUHLIK 2,586,666

SOUND-ON-FILM RECORDING AND REPRODUCING MACHINE

Filed May 4, 1944 4 Sheets-Sheet 1

INVENTOR.
Jacob M. Kuhlik
BY
Edw. S. Higgins
ATTORNEY

Feb. 19, 1952 J. M. KUHLIK 2,586,666

SOUND-ON-FILM RECORDING AND REPRODUCING MACHINE

Filed May 4, 1944 4 Sheets-Sheet 2

INVENTOR.
Jacob M. Kuhlik
BY
Edw. S. Higgins
ATTORNEY

Feb. 19, 1952 J. M. KUHLIK 2,586,666

SOUND-ON-FILM RECORDING AND REPRODUCING MACHINE

Filed May 4, 1944 4 Sheets-Sheet 3

INVENTOR.
Jacob M. Kuhlik
BY
Edw. S. Higgins
ATTORNEY

SOUND-ON-FILM RECORDING AND REPRODUCING MACHINE

INVENTOR.
Jacob M. Kuhlik
BY
Edw. S. Higgins
ATTORNEY

Patented Feb. 19, 1952 2,586,666

UNITED STATES PATENT OFFICE 2,586,666

SOUND-ON-FILM RECORDING AND REPRODUCING MACHINE

Jacob M. Kuhlik, Brooklyn, N. Y., assignor to Hattie B. Kuhlik, Sea Gate, N. Y.

Application May 4, 1944, Serial No. 534,054

1 Claim. (Cl. 274—11)

This invention relates to a machine for recording sound vibrations on a strip of endless film for reproduction purposes and also for reproducing sound from such a film and particularly to a machine of the multi-track type.

It is a primary object of my invention to provide in a multi-track, sound-on-film recorder and/or reproducer, automatic means for relatively shifting the recorder and reproducer from track to track of the film.

Another object is to adjust the stylus of the sound unit upon the film.

Another object is to so loop the endless film upon its support that both surfaces of the film are utilized automatically for cutting grooves thereon and for reproducing therefrom.

Another object is to drive the film by pressure friction thereby eliminating the need of sprocket wheels and perforated film tape, and eliminating noise, providing a steady constant smooth flow of film, preventing slipping of the film and preserving the film fresh and clean.

Another object is to provide a carrier or support for a reel or loop of endless film provided with means for adjusting the tension of the film lengthwise and permits ready mounting and demounting of the film thereon in looped formation.

Another object is to provide such a reel holder with improved film guiding means thereby eliminating the necessity of reel sides customarily used to guide the film and thus eliminating all strain and friction during travel.

Another object is to provide a carrier or support for the reel whereby the film is visible through its entire path of travel and is readily accessible for any desired purpose.

Another object is to provide means for bypassing the sound box to utilize the apparatus for public address purposes.

Another object is to provide means for reproducing the recorded matter for an indefinite period of time.

Another object is to provide such a film holder that is simple and rugged in construction and inexpensive to manufacture.

Another object is to releasably support the layer of film in operative position adjacent the stylus.

Another object is to provide means for stopping the film drive instantaneously, without stopping the motor.

Another object is to regulate the speed of the film drive.

Another object is to save film by utilizing both surfaces of the film for cutting sound grooves thereon.

According to another object of my invention a track is cut upon one surface of the endless film for its entire length and then automatically the opposite surface of the film is presented to the cutting stylus and a track is cut upon said opposite surface for the entire length of the film when the first named surface is again presented to the stylus for cutting a second track thereon for the entire length of the film and so on until tracks are cut upon both surfaces of the film across the width of each or any portion of such width desired.

Figure 1:
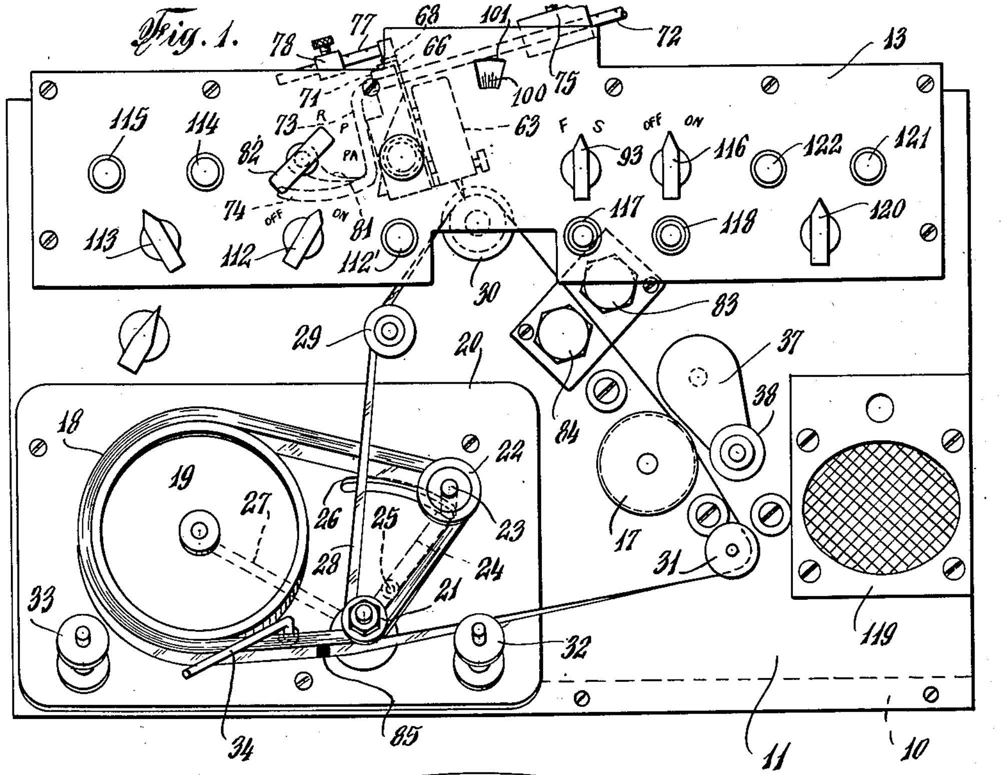
Fig. 1 is a front view of my improved machine.

My improved machine may be of the stationary or portable type and comprises a base 10 with a front wall 11. Supported on said wall forwardly thereof by means of cross bars 12 is a panel or instrument board 13 extending from the top a short distance therebelow.

The machine is electrically operated and is adapted to be connected to a source of electromotive power, such as the house supply. Current is brought to a motor 14 supported by brackets 15 on the rear of the wall 11. The motor shaft 16 drives a drive roller 17 at the front of the wall.

The film used with my machine is of the endless or continuous type and is formed of any suitable film stock, such as cellulose acetate which is transparent and is neither coated nor perforated. It consists of a reel or loop 18 including a plurality of layers. The reel is supported in looped formation on a disk 19 rotatably mounted on a plate 20 fastened to the front of the wall at one of the lower corners thereof. This plate is mounted at an angle to the vertical so that its lower portion projects outwardly of the wall and the disc is mounted truly parallel with said plate so that both the plate and disc are tilted relative to the wall leaving a clearance at the bottom to permit the looped reel to be mounted over the disc. A portion of the reel is looped over an idler roller 21 on the plate and over and adjustable tensioning roller 22 which is rotatably mounted on a stub shaft 23 carried at the free top end of an arm 24 pivoted at 25, at the rear of the plate. The shaft 23 moves in an arcuate slot 26 formed in the plate against the action of a spring 27. The innermost layer or convolution 28 of the film reel or winding leaves the reel at the point of the idler roller 21 and passes upwardly over an idler roller 29 on the front of the wall 11 and upwardly over a base member or anvil 30 on the front of the wall 11. From the base, the layer 28 of film passes downwardly to and over the drive roller 17 only lightly engaging the surface of said drive roller and from there it returns to roller 21 and back to the reel to become the outermost layer or convolution of the reel as will be seen from Fig. 1. Plate 20 has stud members 32 and 33 at each of the lower corners for supporting a plate (not shown) in the front thereof for keeping the reel intact and in position.

A finger piece 34 may be mounted on the plate 20 so as to extend across the side edge of the reel and layer 28 to prevent such parts from becoming displaced laterally.

Figures 6, 7:
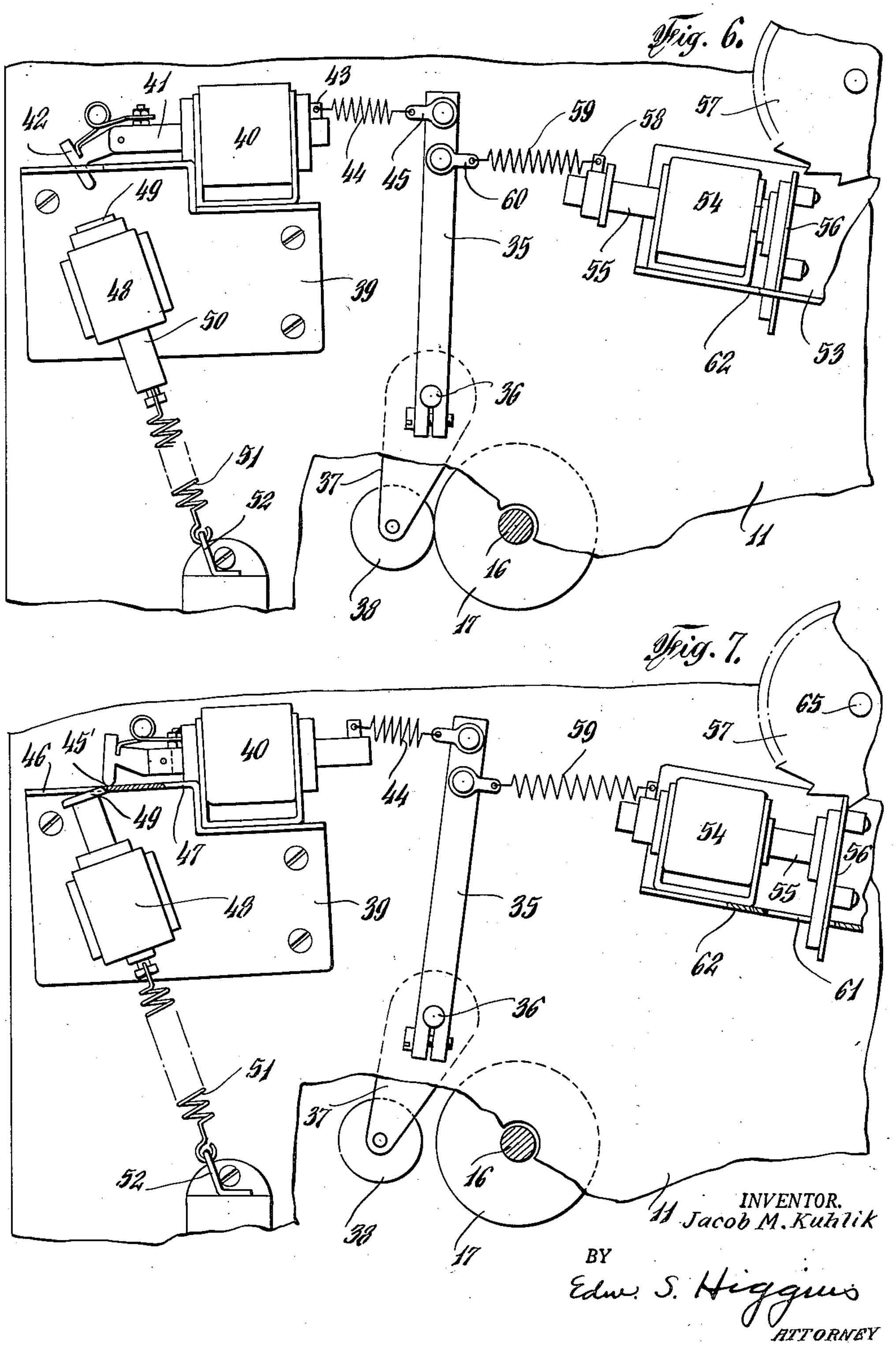
Fig. 6 is an enlarged fragmentary view showing the pressure roller moving mechanism and the sound unit moving mechanism with some of the parts being missing.
Fig. 7 is a view similar to Fig. 6 but showing the parts in moved position.

Referring to Figs. 6 and 7, a vertically disposed bar 35 is mounted at the rear of the wall 11 on a stub shaft 36 which is rockably mounted in the wall 11 and extends through an opening in said wall to the front thereof. The front end of this shaft 36 supports fixedly an arm 37 and carried on the free end of arm 37 is a presser roller 38 which is adapted to be swung into and out of engagement with the drive roller 17.

A bracket 39 fixed to the rear of wall 11 and to one side of the bar 35 supports a magnet 40. One end of the core 41 of the magnet is formed with a spring pressed pivoted nose 42 and the opposite end of the core has a lug 43 fixed thereto. The nose 42 is adapted to engage and to interlock with the edge wall 45′ of a slot 46 formed in a shelf 47 on the bracket 39 for holding the core in extended position.

Another magnet 48 is mounted on the bracket 39 below the slot in the shelf 47 and is so positioned that one end 49 of its core 50 is adapted to move into and out of engagement with the nose 42 of core 41 for forcing said nose out of interlocking engagement with the edge wall 45′ of the shelf. A coiled spring 51 has one end fastened to the opposite end of core 50 and has its other end secured to a fixed bracket 52.

On a bracket 53 fastened to the wall on the other side of bar 35 is another magnet 54. The core 55 of this magnet has a plate 56 fastened to one end thereof adapted to be moved into and out of engagement with the teeth of a toothed wheel 57 for a purpose later to be described. The other end of the core mounts a lug 58 for connecting said end to a coiled spring 59, the other end of which spring is fastened to a lug 60 on the bar 35 adjacent its top end. The plate member 56 moves in and is guided by the walls of a slot 61 formed in the shelf 62 of the bracket 53.

Figures 3, 4, 5:
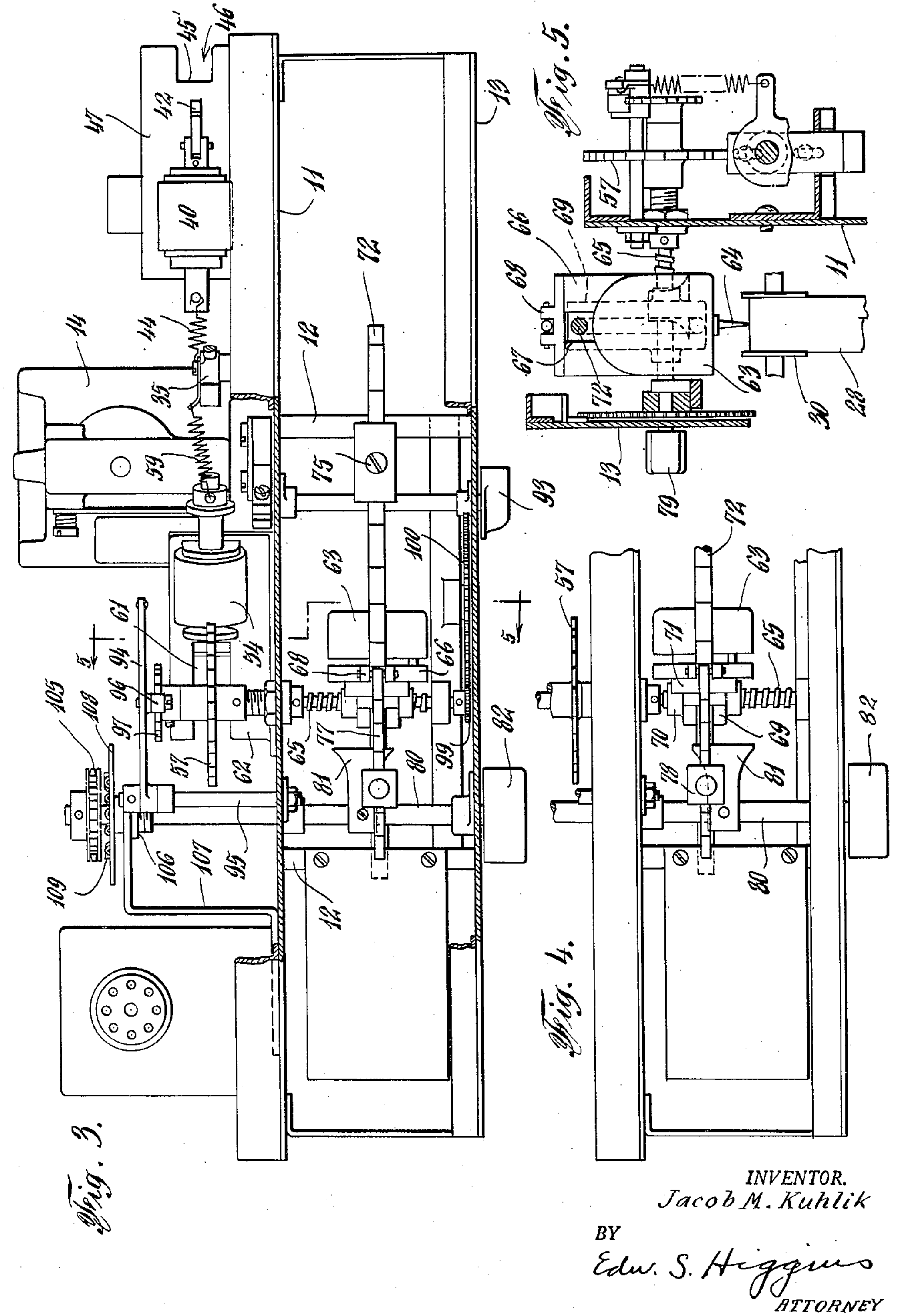
Fig. 3 is an enlarged top plan view.
Fig. 4 is an enlarged top plan view of a fragment of the machine showing the sound unit moved to a position different from that shown in Fig. 3.
Fig. 5 is an enlarged sectional view taken on the plane of the line 5—5 of Fig. 3.

Referring to Figs. 3, 4 and 5, the sound unit of my improved machine comprises a sound head or box 63 containing the ordinary electro-magnetic mechanism for recording and reproducing sound and having a detachable stylus 64. The sound box is mounted for step-by-step movement along a screw threaded shaft 65 extending across and journalled in the wall 11 and instrument board 13 adjacent the top thereof. The sound box 63 is secured to one side of a plate 66 having a central opening 67 near its top and with spaced bearing lugs 68 on its top edge. On plate 66 on the side opposite the sound box is an arm member 69 formed with an internally screw threaded sleeve bearing member 70, the threads of which engage the external threads on the shaft 65. A vertical bar or casting 71 is positioned alongside of plate 66 and is formed with an opening through which the threaded sleeve member 70 loosely extends. A notched rod 72 is supported in an opening in this casting near the top end. This rod has an elongated horizontal portion as seen in Fig. 1, a vertical portion 73 extending downwardly along the casting 71 which terminates in a slightly curved horizontal portion 74 extending in a direction opposite to the direction of the elongated horizontal portion. This rod 72 extends through an opening in the plate 66 and adjustably supports a weight 75 on its elongated horizontal portion. The combined weight of the rod 72, weight 75 and casting 71 is transmitted to the sound box or head 63 through the arm 69 of plate 66.

The sound box 63 and plate 66 move hingedly as a unit relative to the casting 71 and the extent of the swinging movement of said unit may be regulated by a notched rod 77 hingedly supported on the top of the plate 66 by the lugs 68, and a weight 78 adjustably supported on said rod 77 for holding the moved unit in adjusted position.

A knob or handle 79 is fastened to the outer end of the shaft 65 for manually rotating the same.

Rockably supported by the wall 11 and instrument board 13 and extending therebetween in parallel relationship to the shaft 65 is a shaft 80 and fixed on shaft 80 is a cam member 81 with a flaring edge adapted to be moved into and out of engagement with the curved portion 74 of rod 72. Then moved downwardly into engagement with this rod 72, as viewed in Fig. 1, because of the rigid connection between said rod and the casting 71, plate 66 and sound box 63, said casting, plate and sound box are tilted upwardly as a unit carrying the stylus 64 of the sound box off of the film.

Figure 10:
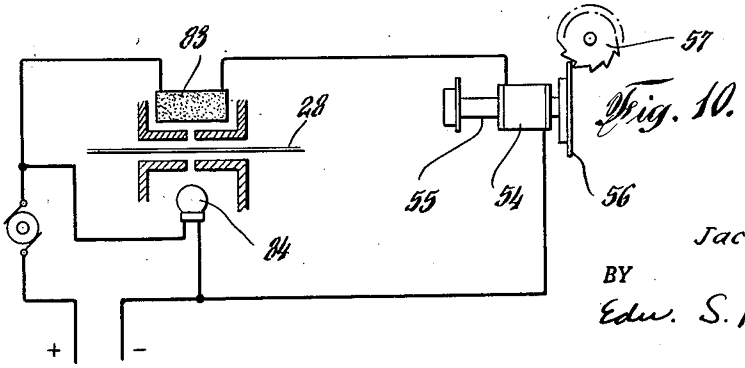
Fig. 10 is a diagrammatic view showing the circuit for the photo-electric cell.
Figure 2:
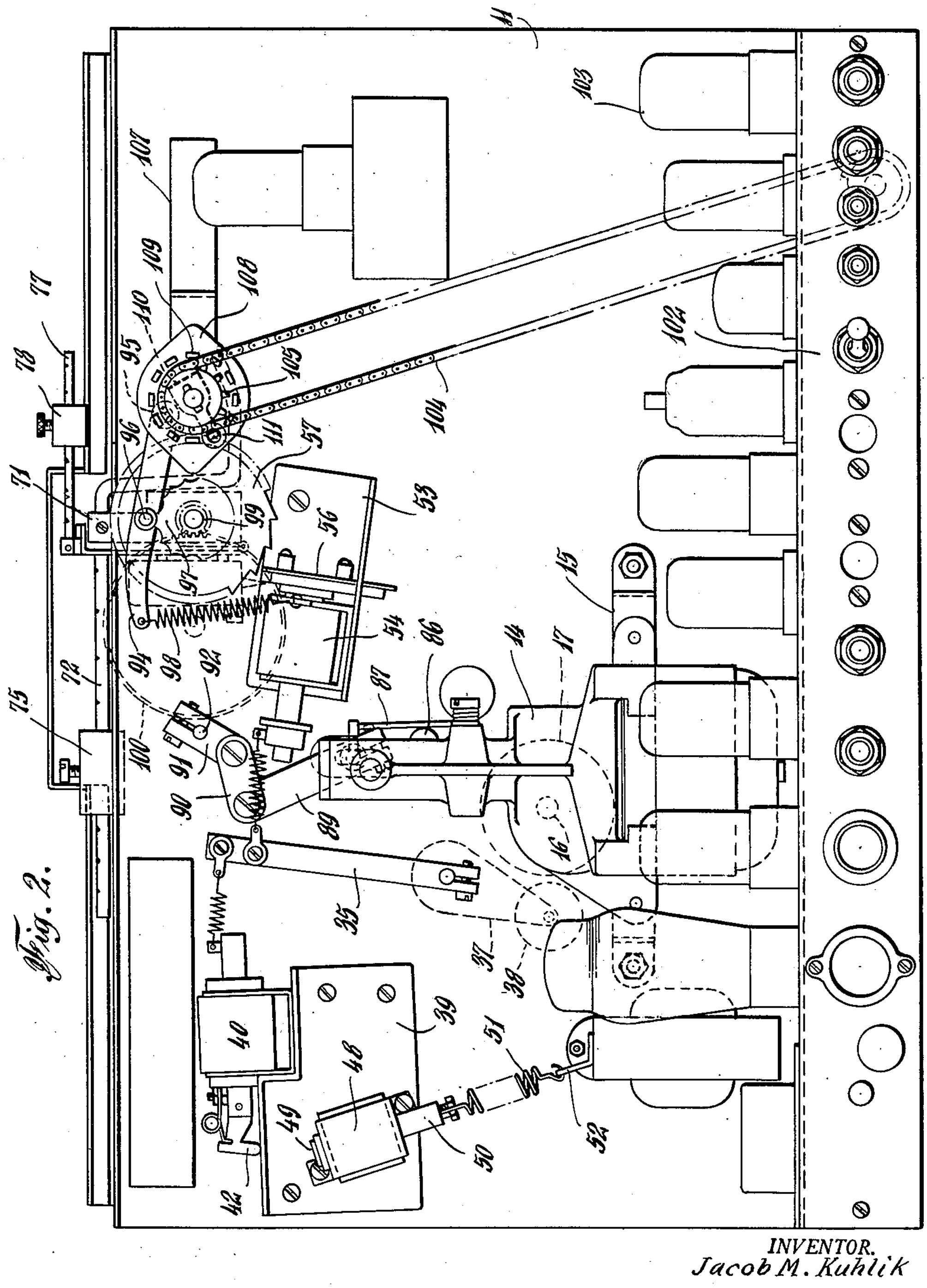
Fig. 2 is an enlarged rear view thereof.

An important feature of my present invention is mechanism for automatically moving the sound box 63 step-by-step, along the shaft 65, and track-by-track across the film. This mechanism includes a photo-cell indicated generally at 83 and an agitating light indicated generally at 84, in Fig. 1, and shown diagrammatically in Fig. 10. Any approved type of photo-electric cell sensitive to light may be used. The cell and light are positioned adjacent the path of movement of the film but oppositely disposed so that the beam from the light will agitate the cell and so that said film will pass between the light and cell. The film is provided at a point along its length with an opaque section 85 extending from edge to edge of the film. During the travel of the film, the opaque section will pass between the light and cell and interrupt the beam as will be understood.

The photo electric cell is in circuit with the magnet 54 and when the beam from light 84 is interrupted the cell becomes active closing the circuit through magnet 54 and thus energizing the same. When energized, the core 55 moves outwardly forcing the plate 56 at its end against one of the teeth of wheel 57, which wheel is operatively connected to shaft 65 mounting the sound box 63. Movement of the wheel one notch will rotate the screw threaded shaft 65 one notch thereby moving the sound box one step along the shaft and move the stylus from one track to the next track upon the film as will be understood. The core 55 of magnet 54 is returned to normal inoperative position by the coiled spring 59.

Means may be provided for regulating the speed of the drive for the film. An ordinary governor ball 86 is adapted to be engaged by a breaking arm 87 actuated by a pin 88 moved by an arm 89 connected by a link 90 to another arm 91 fastened to a movable shaft 92 extending from the rear of wall 11 to the front of the instrument board 13 where it can be manually operated by a knob 93 for fast or slow movement as desired.

I also provide mechanism for balancing the movement of the toothed wheel 57 and operating shaft 65 for the sound unit. This mechanism includes a weighted bar member 94 pivotally mounted at one end on a stub shaft 95 extending rearwardly from the wall 11. The bar carries a pin 96 midway its length and extending laterally thereof, which pin is adapted to engage in the grooves on the periphery of a grooved wheel 97 fixed on the extension of shaft 65 mounting the toothed wheel 57. The other end of the bar is fastened to one end of a spring 98, the other end of which spring is fastened to the bracket 53 supporting the magnet 54. As the toothed wheel 57 and shaft 65 rotate, they carry the grooved wheel 97 around against the action of the spring pressed pin 96 thereby keeping the movement of such parts balanced and under control to prevent slippage and to provide smooth movement.

Means may also be provided for indicating the position of the stylus on the film. For this purpose, a spur gear 99 is fastened to the extension of shaft 65 mounting the toothed wheel 57, just inside of the instrument board 13, which gear is in continuous mesh with the toothed periphery of a disc dial member 100 mounted rotatably on a stub shaft on the instrument board. The dial 100 carries indicia on its surface such as the track number or the section of a particular track, which indicia is seen through a window 101 formed in the instrument board. The dial 100 and toothed wheel 57 are synchronized and corelated so that the track on which the stylus is working appears in the window.

The amplifying apparatus for amplifying the sound reproduced by the machine is carried by a chassis 102 but forms no part of the present invention. This apparatus includes the various tubes 103 for recording, reproducing or play-back and public address systems, and the switch controls for operating such mechanism. The master switch control for the amplifying apparatus is actuated by an endless chain 104 extending from and moved by a sprocket wheel 105 fixed on the inner end of rockable shaft 80 mounting the cam 81. The inner end of the shaft 80 is supported by a bushing 106 on a bracket 107 and fixed on the bushing 106 is a disc member 108 having spaced protuberances 109 on its surface. A lug member 110 fixed on the shaft adjacent the disc member has an eyelet portion 111 adapted to wipe over said disc member and engage said protuberances for holding the shaft 80 in moved position.

In operation, for recording sounds passing through either a microphone or telephone, the knob 82 on shaft 80 is turned to the position "R" for recording. When in this position, the cam 81 is free of the curved portion 74 of the rod 72 so that the combined weight of the sound box 63, plate 66, casting 71 and rod 72 with its weighted member 75 is impressed upon the stylus 64 so that it will have sufficient weight to cut a track on the film surface for its entire length for recording purposes. Turning the shaft 80 to recording position also moves the chain 104 to bring the amplifying apparatus into circuit with the broadcasting device for reproducing purposes.

A master switch 112 is turned for closing the electrical circuits for the various mechanisms, at which time a pilot light 112′ lights up to indicate that recording is in progress. A switch 113 is turned to bring either the microphone, indicated by the pilot light 114, or the telephone, indicated by the pilot light 115, into circuit with the apparatus.

Switch 116 is turned to start the motor 14 for driving the drive roller 17. The speed of the motor may be regulated by turning the knob 93 to "F" for fast or "S" for slow.

To start the film travelling around its path, a switch button 117 is moved to close the circuit including the magnet 40 thereby energizing said magnet at which time its core moves outwardly rocking the bar 35 on its pivot and thereby swinging the presser roller 38 into pressing engagement with the film and driver roller whereby said film is caused to move around and to be fed to the stylus 64. The nose portion 42 will have by this time moved over into the slotted portion 46 of the shelf 47 and be latched over the edge wall 45′ for holding the core in outward operative position.

The film being endless will be cut for its entire length parallel to its edges and will travel around its circuitous path until the opaque section 85 thereof comes between the light 84 and photo cell 83 cutting off the beam from said light and activating the cell. When this cell becomes activated, it closes a circuit including the magnet 54 and when this magnet becomes energized its core moves outwardly carrying the plate 56 into engagement with a tooth of the toothed wheel 57 forcing said wheel around one notch and thereby rotating the screw threaded shaft 65 and moving the sound unit including the sound box and stylus one step across the film to position the stylus for cutting another track thereon. The core of the magnet 54 is immediately returned to its normal inoperative position by the spring 59. There is no stopping of the movement of the film on other parts during this movement of the stylus from track to track.

For stopping the traveling movement of the film or to stop the recording, a switch button 118 is moved to close a circuit including the magnet 48 whereby said magnet becomes energized when its core 50 will move into engagement with the nose latching member 42 releasing said latch permitting the spring 59 to pull the arm 35 on its pivot for swinging the presser roller 38 away from the drive roller 17 at which instant the movement of the film as well as the recording stops. The stoppage is thus accomplished instantaneously so that the sound can be stopped even after a syllable and started at the same point.

For reproducing the recorded matter on the film, the knob 82 is turned to the position "P"

called the "Play-Back" position. This moves the cam 81 on shaft 80 into engagement with the curved portion 74 of the rod 72 exerting but a slight pressure on said rod. At the same time, the weight 78 on the rod 77 may be moved along said rod to the side of the pivotal point of the sound unit to thereby offset the weight of said sound unit and connected parts. The weight 75 on the rod 72 may be moved toward the said pivotal point to lessen the weight. This relieves the pressure on the stylus but sufficient pressure remains to keep the stylus in engagement with the walls of the cut groove or track for reproducing the sound. Movement of the shaft 80 to "P" position turns off the pilot light 112' and simultaneously, by means of the chain 104, closes the circuit through the amplifying apparatus for "Play-Back" purposes only. The sound is reproduced and sent through either a loud speaker 119 built in the machine and operatively connected to the sound box and amplifying apparatus, or a loud speaker situated remote from the machine, either of which speakers may be placed in circuit by a switch member 120. A pilot light 121 may be used to indicate that the loud speaker 119 is in circuit or a pilot light 122 may be used to indicate that the remote loud speaker is in circuit. The pilot lights may be of the same or different colors.

For reversing the travel of the film or for manipulating the film for any desired purpose or for connecting the apparatus to public address systems, the knob 82 is turned clockwise, as seen in Fig. 1, to the position "PA," called "Public Address," so as to bring the cam 81 into engagement with the curved portion 74 to force said portion downwardly and to pivot the sound box and associated parts around the pivot point and lift the stylus off of the film. When the stylus is thus off of the film, the film can be reversed in direction or it can be moved ahead for necessary attention. When in this position any sound going into the microphone or telephone passes directly into and through the amplifier apparatus where it is amplified for public address and sent through the loud speaker.

From the foregoing, it will be seen that I have designed novel apparatus for mounting and demounting the film reel. The film is wound in the form of a reel or loop with a number of layers or convolutions and with one layer extending loosely from the remaining layers. The looped layers are positioned around the periphery of the disc 19 and around the peripheries of the rollers 21 and 22 which can readily be done by moving the roller 22 inwardly and after it is encircled by the looped layers permitting it to be pulled outwardly again by the spring 27. The loosely extending portion of the layer is looped around the rollers 21, 29, base 30 and rollers 17 and 31. The tilting of the lower peripheries of the disc, and roller 21 from the horizontal plane facilitates this mounting.

Figure 8:
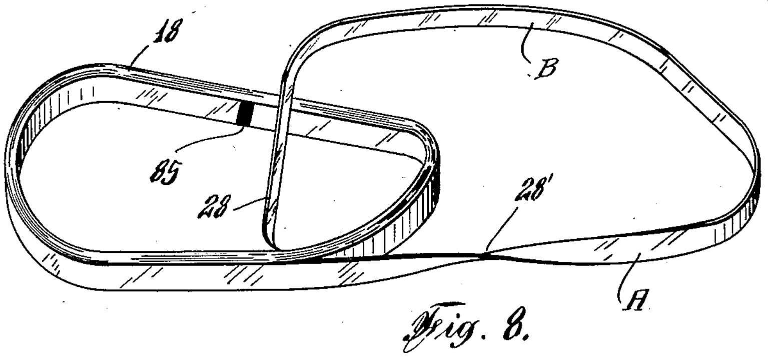
Fig. 8 is an enlarged perspective view of an endless film used with my improved machine.
Figure 9:
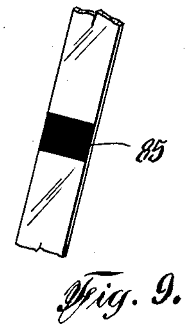
Fig. 9 is an enlarged view showing a fragment of the film to show the opaque section for operating the photo-electric cell.

Another important feature of my invention is the means for utilizing both surfaces of the film for recording and reproducing purposes. By reason of this novel means, a number of sound tracks can be impressed on both sides or surfaces, for example, forty (40) on each surface. Heretofore only one surface has been utilized. I accomplish this by forming a twist, as indicated at 28' in the endless or continuous reel as shown in the reel of Fig. 8. The film reel shown on the machine of Fig. 1 is not formed with the twist. When a reel with a twist therein as shown in Fig. 8 is used with the apparatus of Fig. 1, it is preferred to mount the reel on its support so that the twist occurs between the rollers 31 and 21 although this is not necessary for carrying out the purpose of the twist as it may be formed at any point along the length of the film. By reason of this twist in the reel, first one surface, for example, the surface indicated at A is presented to the stylus for the entire length of the film reel for cutting a track thereupon for the entire length, and then upon completion of a complete rotation of the entire length of film, the surface opposite to said surface A, or the surface indicated at B will be presented to the stylus for cutting a track upon said surface B for the entire length of the film reel, and when the end of said length is reached, the first-named surface A will again be presented to the stylus for cutting another track thereupon for its entire length, and so on until the stylus has traversed across the width of the film. It will be understood that the tracks on the opposite surfaces will be alternately arranged. For example, if the tracks are to be cut from right to left of the film as viewed in Fig. 9, the first track on the first surface presented to the stylus, say surface A, will be adjacent the right edge. Then a track is cut on the opposite surface B at a point one space toward the left from the track on surface A. Next a second track is cut on surface A at a point to the left of the track on surface B and so on until the stylus reaches the left hand edge of the film. This presentation of the opposite surfaces of the film to the stylus is done automatically without stoppage of the travel of the film. The film stock of commerce is of sufficient depth to permit this cutting of tracks upon both surfaces.

The photo-electric cell may be cut out of the system or made ineffectual in which case the stylus will remain in the same track and will continue to reproduce the recorded matter in said track for an indefinite period of time which is invaluable for advertising purposes.

It will be understood that a device such as a Neon flasher may be connected to the system for indicating the level of the sound being recorded or broadcasted.

It will also be understood that mechanism may be operatively connected to the system for automatically controlling the volume or for boosting the incoming signals or for limiting the outgoing signals.

The various switches provided may be controlled remotely if desired and any number of loud speakers or microphones and any type of microphone may be used.

Changes may be made in details of construction without departing from the principle of the invention.

I claim:

In a sound recording and reproducing machine, an endless transparent traveling film, having an opaque section, means for moving said film, an externally screw-threaded shaft, a sound unit including a sound box with a stylus adapted to engage said film, a plate fixed to said box, a tubular sleeve member on said plate having internal screw threads adapted to coact with the threads on said shaft, magnetically operated means for rotating said shaft including a toothed wheel on the end of said shaft, a magnet adjacent said wheel with its core movable into and out of engagement with the teeth of said wheel and a photoelectric cell controlled by the passage of the opaque section of the endless film for actuating said magnet and means for balancing the movement of said shaft comprising a grooved wheel fixed on said shaft adjacent said toothed wheel and a spring pressed weighted arm yieldingly engaging said grooved wheel for balancing the movement of the shaft.

JACOB M. KUHLIK.

REFERENCES CITED

The following references are of record in the file of this patent:

UNITED STATES PATENTS

| Number | Name | Date |
|---|---|---|
| 1,721,362 | Weir | July 16, 1929 |
| 2,066,041 | Kiel | Dec. 29, 1936 |
| 2,085,442 | Newell | June 29, 1937 |
| 2,166,079 | Ricchiardi | July 11, 1939 |
| 2,168,792 | Daniel | Aug. 8, 1939 |
| 2,183,117 | Daniel | Dec. 12, 1939 |
| 2,221,661 | Woolf | Nov. 12, 1940 |
| 2,239,359 | Banning | Apr. 22, 1941 |
| 2,251,306 | Thompson | Aug. 5, 1941 |
| 2,259,631 | Flood, Jr. | Oct. 21, 1941 |
| 2,273,024 | De Vry et al. | Feb. 17, 1942 |
| 2,292,856 | Woolf et al. | Aug. 11, 1942 |
| 2,294,854 | Steed | Sept. 1, 1942 |
| 2,323,066 | May | June 29, 1943 |